(12) United States Patent
Womble

(10) Patent No.: US 11,019,923 B2
(45) Date of Patent: Jun. 1, 2021

(54) SYSTEM FOR HANGING ARTICLES

(71) Applicant: Barbara B. Womble, Dallas, TX (US)

(72) Inventor: Barbara B. Womble, Dallas, TX (US)

( * ) Notice: Subject to any disclaimer, the term of this patent is extended or adjusted under 35 U.S.C. 154(b) by 0 days.

(21) Appl. No.: 16/041,265

(22) Filed: Jul. 20, 2018

(65) Prior Publication Data

US 2019/0021491 A1 Jan. 24, 2019
US 2020/0205564 A9 Jul. 2, 2020

Related U.S. Application Data

(63) Continuation-in-part of application No. 13/854,552, filed on Apr. 1, 2013.

(60) Provisional application No. 62/534,854, filed on Jul. 20, 2017.

(51) Int. Cl.
| | | |
|---|---|---|
| *A47B 61/00* | (2006.01) | |
| *A47G 25/06* | (2006.01) | |
| *A47F 5/01* | (2006.01) | |
| *A47F 5/00* | (2006.01) | |
| *F16B 45/00* | (2006.01) | |
| *F16B 2/06* | (2006.01) | |

(52) U.S. Cl.
CPC ........ *A47B 61/003* (2013.01); *A47G 25/0685* (2013.01); *F16B 45/00* (2013.01); *A47F 5/0068* (2013.01); *A47F 5/01* (2013.01); *F16B 2/065* (2013.01)

(58) Field of Classification Search
CPC ..... A47B 61/02; A47B 61/003; A47B 96/021; A47F 2005/0012; A47F 5/0068; A47F 5/01; A47F 5/08; A47F 5/0838; A47G 25/02; A47G 25/06; A47G 25/0607; A47G 25/0635; A47G 25/0664; A47G 25/0685; A47G 25/0692; A47G 25/08; A47G 25/20; A47G 25/4053; F16B 2/065
USPC .......... 211/86.01, 119.004, 106.01, 119.009, 211/100, 113, 123, 124, 193, 181.1; 223/85, 88, 92, 1, 20; 248/73, 248/223.41–224.61, 225.11, 297.21, 214, 248/226.11, 227.2, 227.4, 228.6, 230.6, 248/231.71, 316.1
See application file for complete search history.

(56) References Cited

U.S. PATENT DOCUMENTS

| | | | | |
|---|---|---|---|---|
| 1,587,675 A | * | 6/1926 | Patterson | ............... A47B 61/02 |
| | | | | 211/1.3 |
| 2,217,795 A | * | 10/1940 | Dawson | ................ A47B 61/02 |
| | | | | 211/100 |
| 2,268,894 A | * | 1/1942 | Ogren | .................... A47B 61/02 |
| | | | | 211/100 |
| D154,684 S | * | 8/1949 | Hufeld | .......................... D32/58 |
| 2,487,388 A | * | 11/1949 | Sherwood | .......... A47G 25/0685 |
| | | | | 211/100 |
| 2,510,198 A | * | 6/1950 | Tesmer | ................ F16M 11/041 |
| | | | | 248/229.25 |
| 2,557,627 A | * | 6/1951 | Baril | ...................... A47G 25/18 |
| | | | | 211/100 |

(Continued)

*Primary Examiner* — Jennifer E. Novosad
(74) *Attorney, Agent, or Firm* — Carrington, Coleman, Sloman & Blumenthal, L.L.P.

(57) ABSTRACT

A support apparatus for supporting and displaying hanging articles, the apparatus includes a support arm extending from a first end to a second end; an attachment member secured to the first end of the support arm; and knobs to receive the hanging articles; the attachment member is to tighten onto a closet bar; and the support arm extends substantially perpendicular away from the closet bar.

6 Claims, 2 Drawing Sheets

(56) References Cited

U.S. PATENT DOCUMENTS

| | | | | |
|---|---|---|---|---|
| 2,740,531 A * | 4/1956 | Simpkins | A47B 61/02 | |
| | | | 211/85.3 | |
| 2,985,311 A * | 5/1961 | Irving | A47G 25/746 | |
| | | | 211/85.3 | |
| 2,997,182 A * | 8/1961 | Lewis | A47K 10/08 | |
| | | | 211/119.009 | |
| D191,944 S * | 12/1961 | Reynolds | D6/317 | |
| 3,116,837 A * | 1/1964 | Kelly | A47B 61/02 | |
| | | | 211/94.01 | |
| 3,124,253 A * | 3/1964 | Petrich | A47G 25/746 | |
| | | | 211/94.01 | |
| 3,160,279 A * | 12/1964 | Hovey | A47B 61/02 | |
| | | | 211/94.01 | |
| 3,163,295 A * | 12/1964 | Standard | A47K 10/08 | |
| | | | 211/119.009 | |
| 3,178,033 A * | 4/1965 | Wirsing | A47K 10/14 | |
| | | | 211/119.009 | |
| 3,335,872 A * | 8/1967 | Dodich | A47G 25/746 | |
| | | | 211/85.3 | |
| 3,471,031 A * | 10/1969 | Coplan | D06F 57/00 | |
| | | | 211/100 | |
| D236,053 S * | 7/1975 | Friedberg | 211/96 | |
| 3,897,122 A * | 7/1975 | McEvers | A47B 61/02 | |
| | | | 211/85.3 | |
| 3,954,182 A * | 5/1976 | McEvers | A47B 61/02 | |
| | | | 211/94.01 | |
| D245,134 S * | 7/1977 | Friedberg | D6/324 | |
| 4,078,756 A * | 3/1978 | Cross | F16M 11/06 | |
| | | | 248/231.71 | |
| 4,087,006 A * | 5/1978 | Schill | A47K 3/001 | |
| | | | 211/105.6 | |
| 4,103,781 A * | 8/1978 | Sterling | D06F 57/12 | |
| | | | 211/119.009 | |
| 4,201,304 A * | 5/1980 | Wicklund | A47K 10/04 | |
| | | | 211/123 | |
| 4,316,547 A * | 2/1982 | Varon | A47G 25/0692 | |
| | | | 211/105.1 | |
| 4,474,299 A * | 10/1984 | Andrews | A47F 7/24 | |
| | | | 211/123 | |
| 4,488,651 A * | 12/1984 | Bishop | A47K 3/38 | |
| | | | 211/105.6 | |
| D277,248 S * | 1/1985 | Benedict | D6/324 | |
| D278,106 S * | 3/1985 | Green | D6/315 | |
| 4,624,431 A * | 11/1986 | Pfeifer | F16B 7/0493 | |
| | | | 248/215 | |
| 4,863,043 A * | 9/1989 | Bowen | A47G 25/74 | |
| | | | 211/113 | |
| 4,872,568 A * | 10/1989 | Lehmann | A47G 25/1457 | |
| | | | 211/113 | |
| 5,107,996 A * | 4/1992 | Whittaker | A47G 25/1457 | |
| | | | 211/113 | |
| 5,108,058 A * | 4/1992 | White | A45F 3/44 | |
| | | | 248/126 | |
| 5,178,287 A * | 1/1993 | Klein | A47G 25/746 | |
| | | | 211/100 | |
| D334,292 S * | 3/1993 | Klein | D6/317 | |
| 5,499,725 A * | 3/1996 | Palumbo | A47K 3/001 | |
| | | | 211/105.1 | |
| 6,394,289 B1* | 5/2002 | Panchihak | A47B 61/003 | |
| | | | 211/105.1 | |
| 6,409,131 B1* | 6/2002 | Bentley | A01K 97/10 | |
| | | | 248/219.4 | |
| 6,942,111 B2* | 9/2005 | Harrell | B65G 9/002 | |
| | | | 211/113 | |
| 7,252,275 B1* | 8/2007 | Puckett | A01K 31/14 | |
| | | | 248/316.1 | |
| 7,770,742 B1* | 8/2010 | Wagner | A47K 3/281 | |
| | | | 211/113 | |
| 7,806,280 B1* | 10/2010 | Perkins | A47G 25/0685 | |
| | | | 211/100 | |
| 8,141,722 B2* | 3/2012 | Heroux | A47G 25/1457 | |
| | | | 211/113 | |
| 8,397,961 B2* | 3/2013 | Viehe | A47B 61/003 | |
| | | | 211/85.3 | |
| D806,408 S * | 1/2018 | Womble | D6/327 | |
| 10,021,975 B1* | 7/2018 | Womble | A47B 61/02 | |
| 2004/0211868 A1* | 10/2004 | Holmes | F16M 11/041 | |
| | | | 248/231.71 | |
| 2005/0029208 A1* | 2/2005 | Paiste | A47F 5/0846 | |
| | | | 211/85.6 | |
| 2005/0247837 A1* | 11/2005 | Spencer | A47B 96/061 | |
| | | | 248/218.4 | |
| 2005/0258318 A1* | 11/2005 | Mori | A47B 23/04 | |
| | | | 248/175 | |
| 2012/0037581 A1* | 2/2012 | Anderson | E04H 12/32 | |
| | | | 211/85.3 | |
| 2014/0209770 A1* | 7/2014 | Amoros Cano | A47F 5/0846 | |
| | | | 248/316.1 | |
| 2014/0239132 A1* | 8/2014 | Mariano | H04R 1/08 | |
| | | | 248/74.1 | |
| 2014/0291461 A1* | 10/2014 | Womble | A47F 5/0838 | |
| | | | 248/214 | |
| 2018/0160866 A1* | 6/2018 | Tarlton | D06F 57/12 | |
| 2019/0021491 A1* | 1/2019 | Womble | A47B 61/003 | |

\* cited by examiner

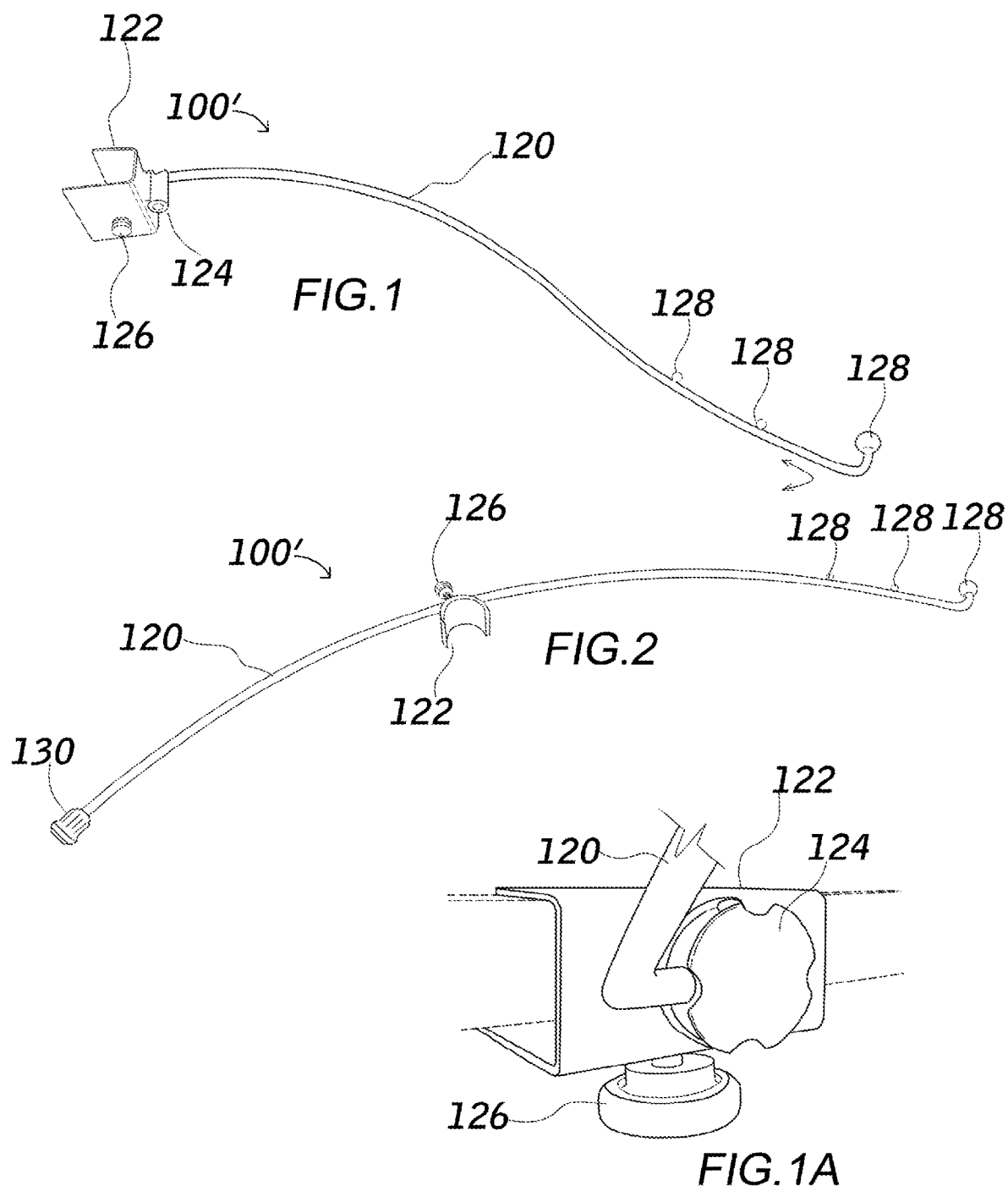

SYSTEM FOR HANGING ARTICLES

BACKGROUND

1. Field of the Invention

The present invention relates generally to supports for hanging articles, and more specifically, to a support frame designed for the consumer market which can be mounted on a clothing bar or shelf for the support of hanging clothing or other articles.

2. Description of Related Art

Support systems for clothing and other hanging articles are well known in the art and are effective means to hang, organize, or hold clothing. One common system is a clothing bar, which is typically straight or circular and receives clothing to hang in a display fashion. Certain commercial clothing bars may also employ support frames which are attached to the clothing bars in order to showcase or enable sorting garments by type.

One of the problems commonly associated with conventional support systems is inconvenient installation and use. For example, typically support systems must be installed independently of standard shelving, wracks, and other structures commonly associated with closets and the like. Therefore, it is desirable to create a support structure to be easily and conveniently installed in a conventional closet, wherein the support structure provides an adequate means to display and hold one or more clothing items.

Accordingly, although great strides have been made in the area of support systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 1 is a perspective view of one embodiment of a support apparatus according to the present invention;

FIG. 1A is a perspective view of a pivot hinge of FIG. 1;

FIG. 2 is a perspective view of a second embodiment of a support apparatus according to the present invention.

Figure 3:
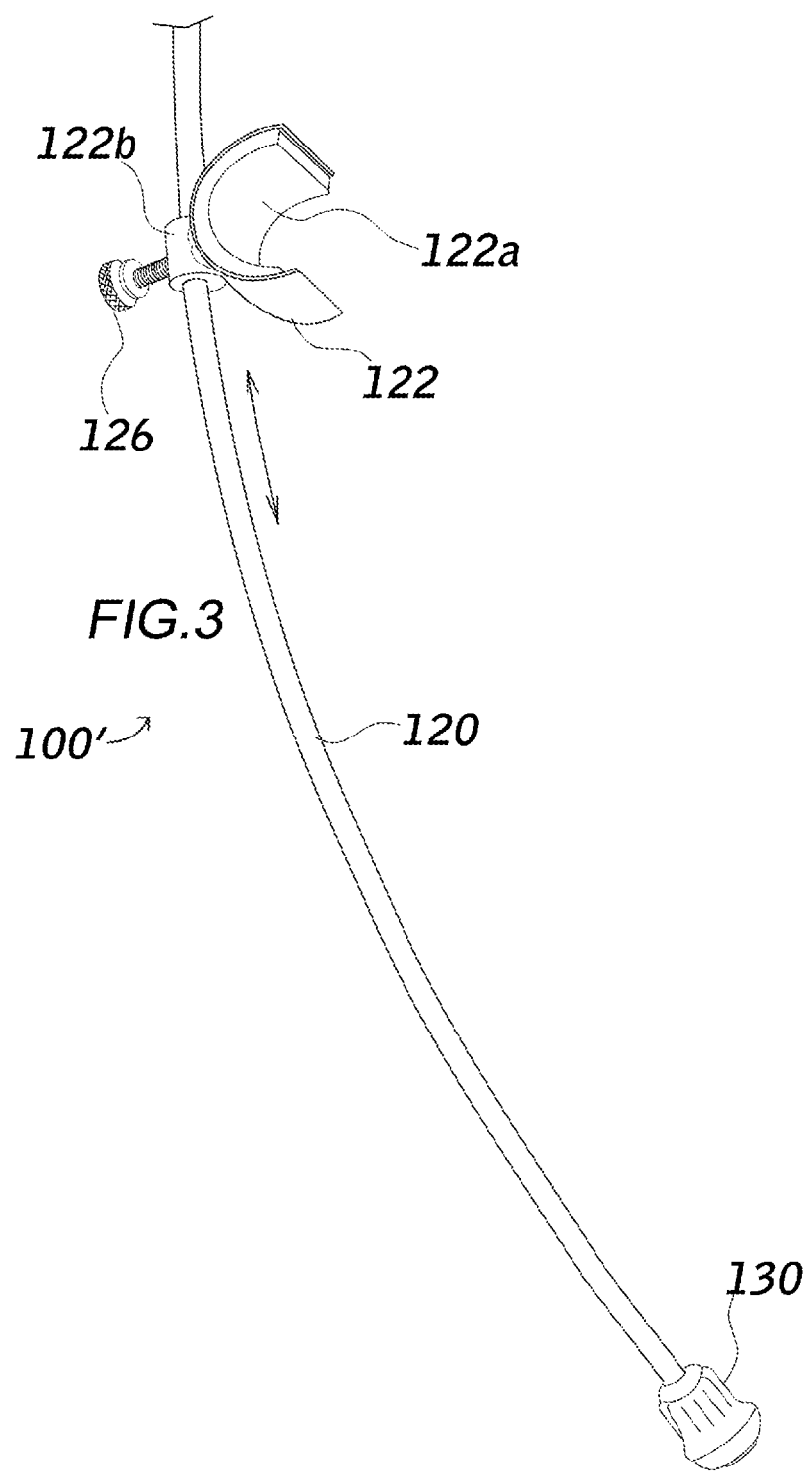
FIG. 3 is an enlarged perspective view of the second embodiment of FIG. 2.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional support systems. Specifically, the present invention provides an apparatus that is convenient for using in a conventional closet, the apparatus configured to support hanging articles. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

The present invention is directed to a garment support for hanging articles that is reversible attached to horizontal supports such as clothing bars, shelves, and the like. One embodiment according to the present invention is mounted to a typical clothing bar so as to project from the bar in order to display articles such as garments from the front rather than the sides. The garment support is especially useful for planning wardrobe changes, selecting items that need to be dry cleaned, and many other wardrobe tasks.

Referring now to the drawings wherein like reference characters identify corresponding or similar elements throughout the several views, FIG. 1 depicts a perspective view of a support apparatus 100 in accordance with a first embodiment of the present application. It will be appreciated that apparatus 100 overcomes one or more of the above-listed problems commonly associated with conventional support systems.

In the contemplated embodiment, apparatus 100 includes a rigid support arm 120 which is configured to attach to a horizontal cylindrical clothing bar as an attachment surface via an attachment member 122, wherein arm 120 extends away substantially perpendicular from the clothing bar (not shown). It should be appreciated that multiple apparatuses 100 could be attached to one cylindrical clothing bar. In this embodiment, support arm 120 projects away from the cylindrical clothing bar, allowing for a user to hang one or more articles on stay knobs 128, thereby presenting the articles to the user to view front on. It should be appreciated that knobs 128 can be hooks, clasps, or any other structure configured to receive a hanger or article and retain said hanger or article in place. In this particular embodiment, knobs 128 are shown as spherical members permanently affixed along the arm, it should be understood that other structures are contemplated such as collars with a frictional fit that slide along a cylindrical or rod-shaped frame, or which are tightened at any point along the frame by screws.

As shown in FIG. 1 A, attachment member 122 can include a pivoting hinge 124, thereby allowing for support arm 120 to pivot relative to attachment member 122. In addition, attachment member 122 can include a tightening member 126 configured to secure the attachment member to the clothing bar. It should be appreciated that the attachment member 122 clamps onto the clothing bar (such as a bar in a closet configured to receive clothing), via tightening member 126.

In FIGS. 2 and 3, a perspective view of a second embodiment of apparatus 100 is shown, having similar form and function as the apparatus of FIG. 1, including support arm 120 and attachment member 122. In this embodiment, a bumper 130 is attached to one end of support arm 120 and configured to brace against a rear wall of the closet. The bracing effect permits the clothing bar to support the weight of several garments facing out to assist in garment selection. It should be appreciated that attachment member 122 can move along arm 120 via a collar 122b, thereby allowing for the user to extend more or less of arm 120 out from the clothing bar as desired. In addition, in this embodiment the attachment member 122 is preferably lined with a material 122a of any suitably non-marring material, such as rubber or felt pad.

It should be appreciated that one of the unique features believed characteristic of the present application is the ability to secure support arm 120 to a support structure, thereby projecting arm 120 away from the support structure. It should be understood that this feature provides a means for the user to view clothing from a front position of the clothing.

It should be appreciated that multiple support structures could be used to create one overall system configured to display articles. In addition, it is contemplated that the size and materials of the support apparatus can vary as aesthetical, functional, or manufacturing considerations require.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A support apparatus for supporting and displaying hanging articles, the apparatus comprising:
    a support arm extending from a first end to a second end;
    a plurality of knobs secured to the support arm at the second end and configured to receive the hanging articles;
    an attachment member movably coupled to the support arm between the first end and a first one of the plurality of knobs at the second end;
    a bumper secured to the support arm at the first end;
    wherein the attachment member is configured to tighten onto a closet bar;
    wherein the bumper is for contacting a location of a wall, the wall proximate the closet bar and the location at a vertical height lower than a vertical height of the closet bar; and
    wherein the support arm is curved to facilitate the bumper for contacting the location of a wall.

2. The apparatus of claim 1, wherein the attachment member comprises:
    a collar; and
    a tightening member;
    wherein the collar is configured to secure the attachment member to the support arm; and
    wherein the tightening member is configured to secure the attachment member to a closet bar.

3. The apparatus of claim 1, wherein the attachment member has a pad configured to secure around a closet bar.

4. The support apparatus of claim 1 wherein the attachment member comprises an arcuate portion for abutting to the closet bar while leaving a portion of the closet bar not in contact with the attachment member.

5. The support apparatus of claim 1 wherein the plurality of knobs is between the attachment member and the second end of the support member.

6. The support apparatus of claim 1 wherein the attachment member is movably coupled to the support arm for allowing a change in an amount of an extension of the support arm relative to a location of the closet bar.

* * * * *